July 6, 1965   P. ARNOLD   3,193,169
ULTRASONIC METAL FOIL SPLICER
Filed Aug. 18, 1961   4 Sheets-Sheet 1

INVENTOR.
PETER ARNOLD
BY
Greene, Pindus and Durr
ATTORNEYS

July 6, 1965  P. ARNOLD  3,193,169

ULTRASONIC METAL FOIL SPLICER

Filed Aug. 18, 1961  4 Sheets-Sheet 2

INVENTOR.
PETER ARNOLD

BY

ATTORNEYS

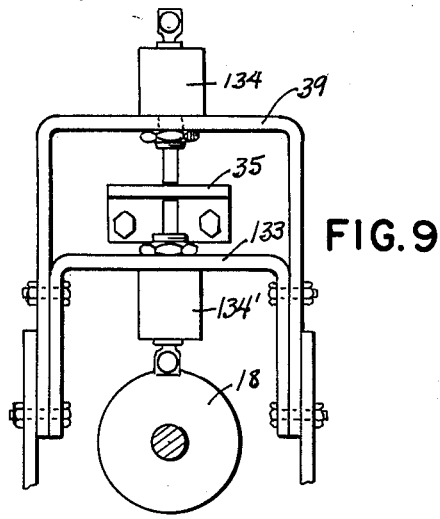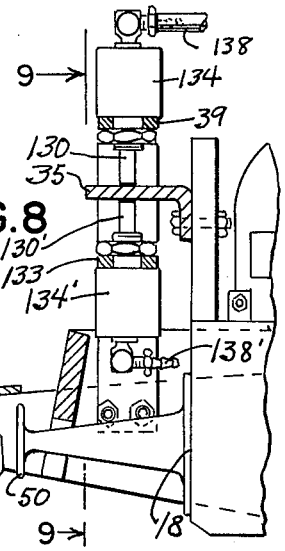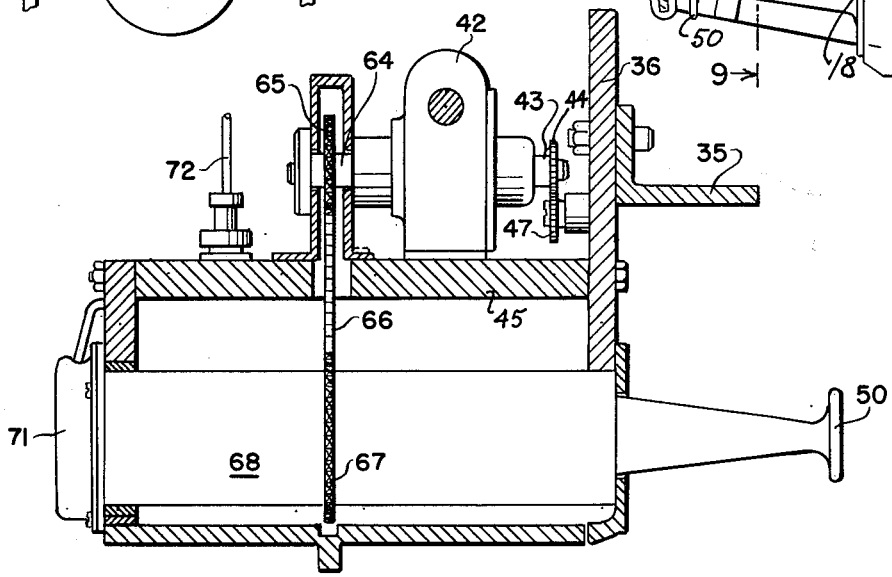

July 6, 1965 P. ARNOLD 3,193,169
ULTRASONIC METAL FOIL SPLICER
Filed Aug. 18, 1961 4 Sheets-Sheet 4
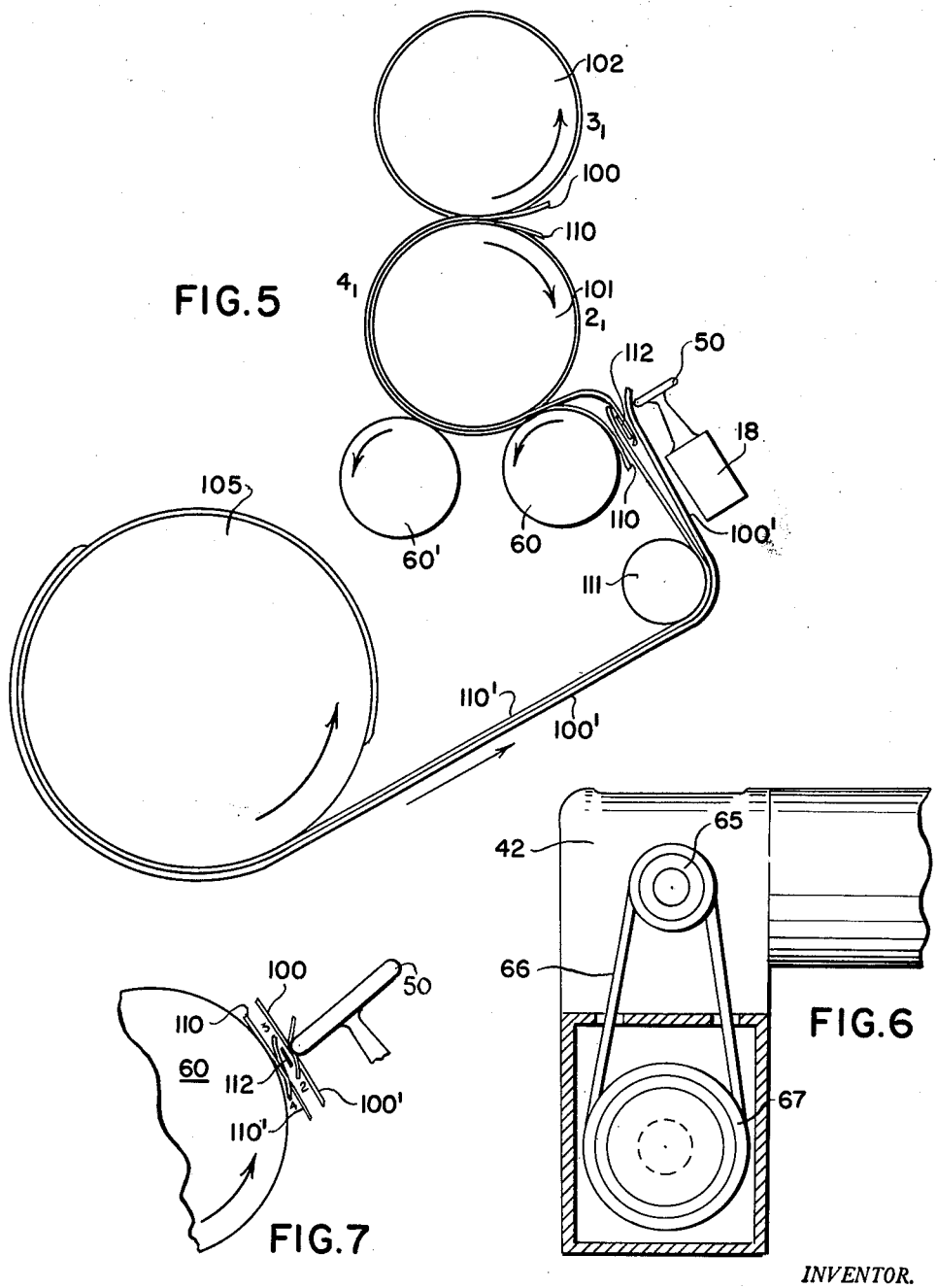
INVENTOR.
PETER ARNOLD
BY
ATTORNEYS

United States Patent Office 3,193,169
Patented July 6, 1965

3,193,169
ULTRASONIC METAL FOIL SPLICER
Peter Arnold, Elberon, N.J., assignor to
The Meaker Company
Filed Aug. 18, 1961, Ser. No. 132,323
3 Claims. (Cl. 228—1)

This invention relates to a device for welding the tail end of a metal foil strip to the head end of a new strip of the foil so as to provide a continuous feed of foil to or from foil wrapping, packaging, foil-forming or foil-processing machines, for example.

It is known that two strips of thermoplastic sheet materials such as "Mylar" and similar films, or aluminum, copper or other foils can be united or welded by ultrasonic devices. The term thermoplastic materials will be understood to include aluminum foils and similar metal foils which can be united by a welding process. Among the objects of the present invention is to provide a particular device for welding the free ends of two foil strips while the end portion of the first of said strips is still on a machine such as a machine for producing foil or a machine for packaging or slitting or using said foil, or a machine for separating and rewinding foil of double thickness into two separate coils, each of one strip or web. Separating machines may be of the horizontal or vertical types, and this invention can be applied to either kind.

The objects of the invention are attained by providing a self-propelled carriage with at least one track therefor extending horizontally and running transversely of one of the rollers of the machine such as a guide roller. The carriage comprises smoothing rollers with an ultrasonic welding probe, tip or wheel therebetween, all of which extend from the carriage to make contact with the foil on said guide roller. The carriage also contains motive means to move it along said track and a generator of ultrasonic power. The device is adapted to be pivotally mounted so that it can be pivoted out of the way when not in use.

In the drawings,

FIG. 3 is a side cross sectional view of the welding unit of the device.

FIG. 5 is a side cross sectional view partly diagrammatic showing the device attached to the winding end of a foil separating and winding machine.

FIG. 6 is a detail cross sectional view taken along line 6—6 of FIG. 2.

FIG. 7 is a detail enlarged view of the welding sonotrode as applied to the overlapping ends of foil of double thickness.

FIG. 8 is a detail side view showing a modified form of the device.

FIG. 9 is a view taken on line 9—9 of FIG. 8.

Figure 1:
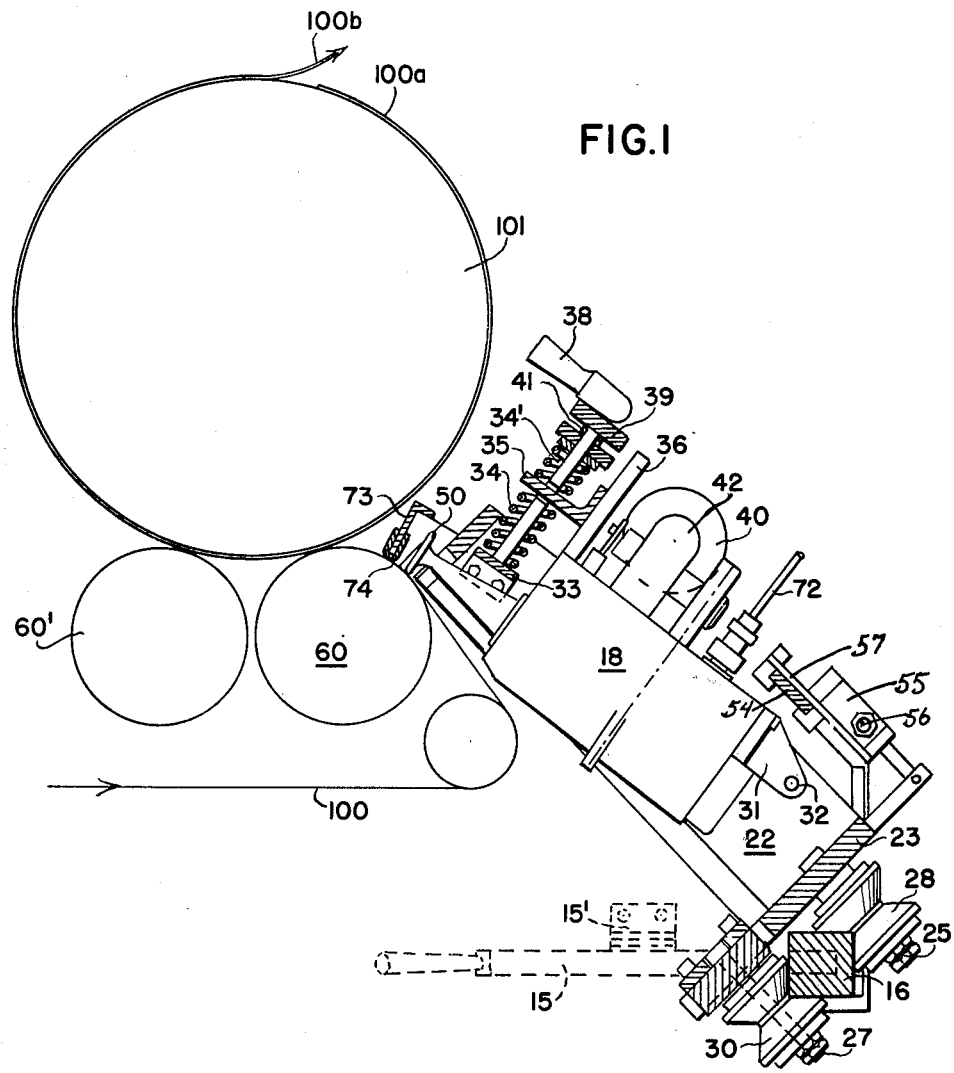
FIG. 1 is a side view of the device as it appears in operative position on the guide roller of a foil feeding end of a separating machine.

The carriage is mounted on the shaft 10 which is mounted to pivot in the bearings 11, 12 which are attached directly to the parts of the frame 13, 14 at the feeding end of the foil separating machine or to frame members supported from the floor at a predetermined distance from the machine. The carriage may be pivoted into and out of operating position by means of lever arm 15 (FIG. 1) for example, which also acts with bracket 15' as a hold down bar. The central part 16 of shaft 10 is square in cross section and provides a track for the carriage 20.

The carriage 20 comprises side frame members 21, 22' and end frame members 23, 24. Attached to the end frame members are shafts 25, 26 and 27 which carry freely mounted hour-glass rollers 28, 29, 30 adapted to guide the carriage 20 on the track 16.

As shown in FIG. 1 the welding housing 18 together with the motor drive means 40 are attached to each other as a unit and the unit is pivotally mounted at the rear end 31 to the sides 21, 22 by means of a shaft 32. The front portion of the unit 18–40 is supported from the frame by means of the bracket 33 (extending between side frame members 21, 22) by means of the spring 34, the upper ring of which bears against bracket 35 which is fixed to the front portion 36 of the unit 18–40. The position of the welding housing 18 with respect to the frame 20 can be changed or rather the pressure of the welding tip or wheel on the feed or guide roller 60 of the machine can be increased from that shown in FIG. 1 by pivoting the pressure cam 38. The pressure applied by said pressure cam 38 can be varied by rotating the pressure adjusting nut 39 to change the position thereof with respect to the sleeve 41 to which the said nut 39 is threaded and thereby increase the pressure applied to spring 34'. Air-pressure devices may be employed in place of springs 34 and 34'.

The motor 40 is connected to the gear transmission means 42 which is attached to a top plate 45 of the housing 18. Projecting from the forward end of the transmission means 42 is a shaft 43 to which sprocket 44 is attached. Two idler sprockets 46, 47 are attached to the bracket 36 (see FIG. 2). A sprocket chain 51 has its ends secured in arms 52, 53 positioned on opposite sides of the frame 17 within which the carriage 20 moves. Thus, it will be seen that rotation of the sprocket 44 causes the carriage to move with respect to the frame member 17'.

Figure 2:
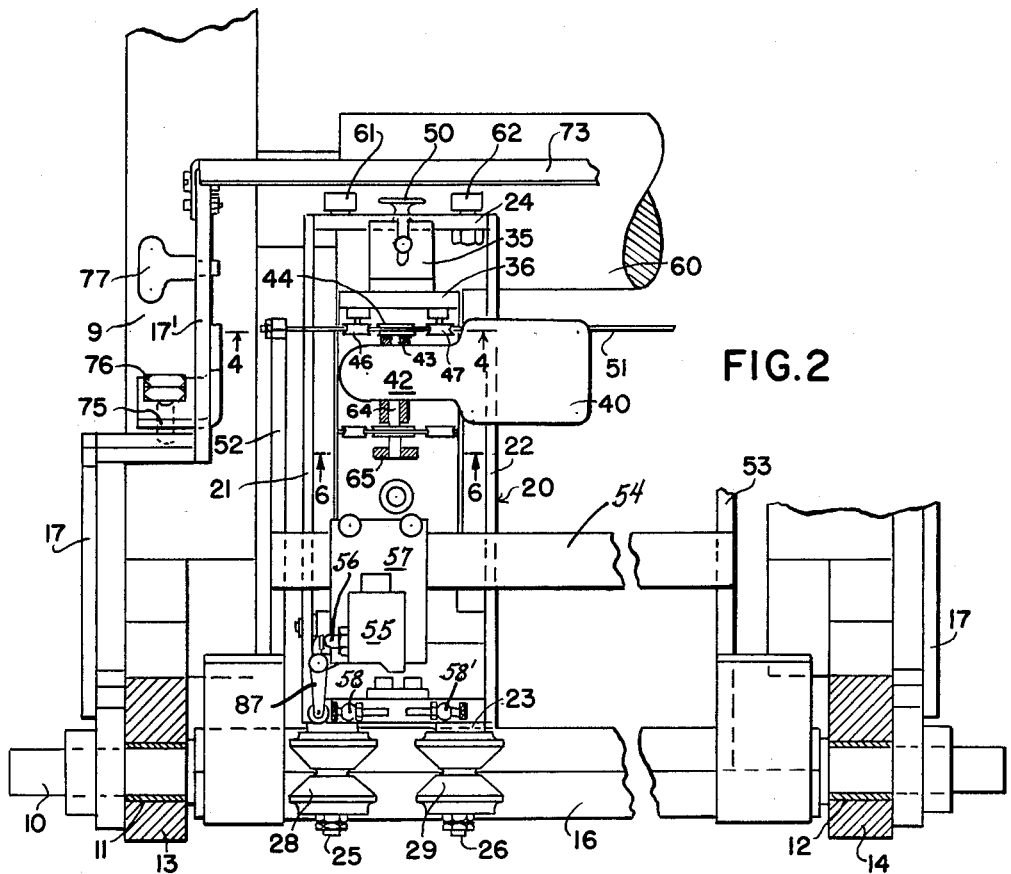
FIG. 2 is a top plan view of the device with a portion thereof omitted.
Figure 4:
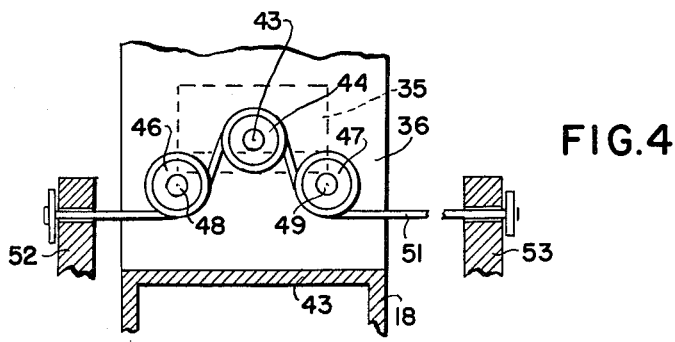
FIG. 4 is a detail view taken along line 4—4 of FIG. 2.

The spacer bar 54 extends from arm 52 to arm 53. A switch-supporting plate 57 is adjustably mounted on bar 54 and secured to this plate 57 is a limit switch 55 adapted to stop the movement of the carriage after it has moved to the left-hand edge of the film to be united as shown in FIG. 2. A similar limit switch is preferably mounted at the right hand end of bar 54 but is not shown. However, the apparatus will operate satisfactorily with one limit switch. The actuator button 56 of limit switch 55 is operated by lever 87 pivotally attached to plate 57. The end 23 of carriage 20 carries one vernier actuator probe 58 or 58' for each switch 55, which may be adjusted to a very close tolerance to operate lever 87 upon movement of the carriage to the edges of the film being welded.

The front end 24 of the frame 20 is provided with rollers 61 and 62 rotatably mounted on opposite sides of the wheel sonotrode 50 which serves to hold the foil to be welded against roller 60 and also serve to maintain the foil smooth.

The transmission means 42 also includes a shaft 64 extending from the rear side thereof to which the sprocket 65 is attached. As best shown in FIG. 3, the sprocket 65 through chain 66 and sprocket 67 rotates the ultrasonic transducer 68. Electrical connections to operate ultrasonic generators are made through a commutator type device 71 which is not shown in detail because it is of conventional design. Thus, the tip or wheel sonotrode 50 is rotated in synchronism with the movement of the carriage to avoid any tearing or bunching of the foil due to friction or skipping of the wheel. The electrical connection to the power source is made through lead wire 72.

The carriage 20 is separately mounted for movement within the confines of a pivoted frame comprising side members 17, 17' (only one shown in FIG. 2) and end member 73 which acts as foil clamping means. The foil-clamping end member 73 may be fitted with an elastomeric foil-contacting surface 74 (see FIG. 1) about the lower edge thereof. The front side member 17' (only one shown in FIG. 2) is fitted with a bracket 75 which projects over a portion 9 of the foil making or separating machine. This bracket contains an opening in which is fitted a quarter turn screw 76 adapted to quickly secure the frame 17, 17', 73, etc. to the foil making machine so as to hold the foil-clamping member 73 tightly on roll 60. Handles 77 are provided to aid in moving the frame into and out of clamping position.

As stated above, air pressure or similar regulatable means may be employed to hold said sonotrode 50 against the foil to be welded. FIGS. 8 and 9 show the air pressure device. In this figure 134 and 134' are air pressure cylinders which are fixed on bracket 39 and 133, respectively, and have pistons 130 and 130' which press on opposite sides of the bracket 35, said bracket 35 being attached to the sonotrode device 18. Cylinders 134 and 134' have connections 138 and 138' respectively to air pressure lines and means are provided (not shown) to adjust the pressure to said connections 134 and 134'.

*Operation of the welder means*

The welder with its carriage 20 and frame 17, 17' and 73 are both normally swung out of welding or clamping position (away from that shown in the drawings) about the axis of shaft 10. FIG. 5 shows a device for separating and winding a double layer of foil. Before the end of a particular foil 100, 110, is wound, the drive roller 60, 60', for the winding rollers 101 and 102 are stopped, the welding device is moved into position, and the end of the inner foil is fed as far as roller 60. The end of the outer length of foil 100' is led onto roller 60 so as to overlap with the tail end of the previous strip. Ordinarily, the outside surfaces of the doubled foil is shiny or mirror-like and the inside surfaces have a satiny finish. Both parts 100 and 110 may be united at the ends simultaneously by inserting a strip of paper between the two inner contacting surfaces which are not to be united and then passing the welding sonotrode thereover. In FIG. 5, the devise is applied to a separating machine where roll 105 contains a double layer of aluminum foil, for example, with mirror-finish surfaces facing each other and satin-finished surfaces on the outside of the double layers. The double layer 100', 110' of roll 105 is passed over idler 110 to roller 60 where the ends are overlapped with corresponding tail ends of 100 and 110 respectively with a strip of paper 112 inserted therebetween. One pass of the sonotrode 50 welds both ends 100–100' and 110–110'. As indicated, the upper thickness 100 is wound on roller 101 and the lower thickness 110 is separated from 100 and wound on 102. In the actual welding, the foil clamping bar 73' is tightly clamped against the overlapping ends by tightening screws 76 of brackets 75. The sonotrode 50 is variably pressed depending on foil thickness against the surface of the roller 60 which holds the overlapping ends by operating hand lever 38 (FIG. 1) or air pressure means 134 and 134' of FIGS. 8 and 9. The generator power is then turned on to excite the ultrasonic transducer and the motor 40 to simultaneously move the carriage 20 across the overlapping ends. The limit switch automatically shuts off the power when the carriage reaches the opposite side of roller 60. Thereafter, the carriage 20 and its clamping frame 17, 17' and 73 is moved out of welding position and the winding drive rollers 60, 60' are started and operated until a new splice is required. The tabs or tail ends on either side of the splice can be torn off, if desired, without disturbing the welded area.

In tearing the tab ends separate neatly at the edge of the weld to provide a narrow welded region having about 90 or 95% or more of the strength of the unwelded portions of the foil. Thus, a weld with the tabs torn off has the appearance of a butt weld and will pass through a slitter or other foil treating means without difficulty.

The device has been described with particular reference to aluminum foils but it is obvious that the device is equally satisfactory with relatively thick metal sheets as well as with sheets and foils of thermoplastic materials such as polyamide, cellulose ester, polyethylene, polypropylene films, etc.

The features and principles underlying the invention described above in connection with specific exemplifications will suggest to those skilled in the art many other modifications thereof. It is accordingly desired that the appended claims shall not be limited to any specific feature or details thereof.

I claim:

1. In a device for ultrasonically welding the tail end of at least one strip of material to the beginning end of a second strip of the same material while at least one of said strips is held on a machine which comprises a roller for guiding or feeding the strip linearly to or from the machine, comprising
    frame means pivotally mounted adjacent to and with the pivotal axis thereof parallel to said roller,
    said frame means including a transverse clamping bar adapted to contact the upper surface of said roller,
    track means on said frame parallel to and spaced from said transverse clamping bar,
    carriage means comprising rollers adapted to interfit with and operate along said track means,
    ultrasonic welding means of the type having a disk-shaped sonotrode,
    means for pivotally mounting said welding means to said carriage at a point spaced from the sonotrode thereof so constructed and arranged that the sonotrode is adapted to rest on said roller adjacent said clamping bar,
    means on said carriage for moving the same transversely of said frame,
    means on said carriage for rotating said disk-shaped sonotrode in synchronism with the movement of said carriage.

2. The device as claimed in claim 1, comprising means on said frame for holding said clamping bar in clamped position against overlapping foil ends, and
    adjustable pressure connecting the sonotrode end of said ultrasonic welding device to the front end of said carriage.

3. The device as claimed in claim 1 comprising switch means carried by said carriage and means adjacent at least one side of said frame to disconnect said switch when the carriage reaches a predetermined region adjacent the side of said frame.

References Cited by the Examiner
UNITED STATES PATENTS

| | | | |
|---|---|---|---|
| 2,333,343 | 11/43 | Sendzimir | 29—470.9 |
| 2,412,648 | 12/46 | Rendel | 219—82 |
| 2,946,120 | 7/60 | Jones et al. | 29—470 |
| 2,977,672 | 4/61 | Telfer | 29—155.5 |
| 3,015,157 | 1/62 | Reynolds et al. | 29—470.9 |
| 3,029,666 | 4/62 | Lovins | 78—82 |
| 3,053,124 | 9/62 | Balamuth et al. | 78—82 |

WILLIAM J. STEPHENSON, *Primary Examiner.*

RICHARD M. WOOD, JOHN F. CAMPBELL, *Examiners.*